C. HORNBOSTEL.
PRODUCTION OF GASES OF HIGH OXIDIZING EFFICIENCY.
APPLICATION FILED MAY 11, 1907.
984,221.
Patented Feb. 14, 1911.
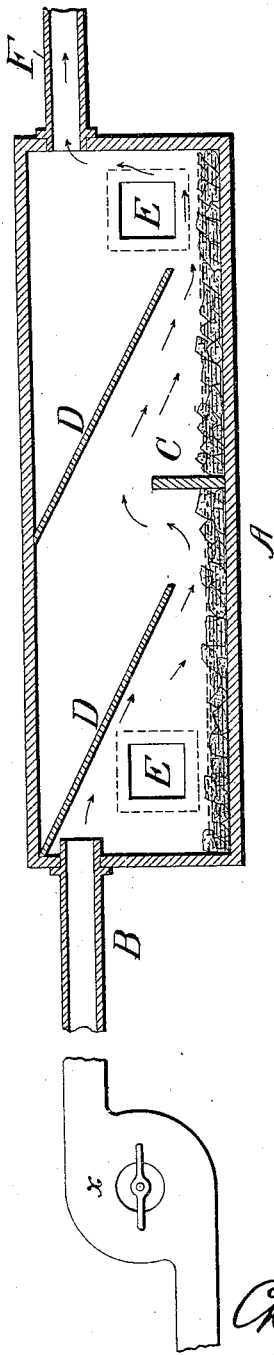
Witnesses
Jos. F. Collins,
L. E. Morrison
Inventor
Charles Hornbostel
By W. R. Kennedy
Attorney

UNITED STATES PATENT OFFICE.

CHARLES HORNBOSTEL, OF NEW YORK, N. Y.

PRODUCTION OF GASES OF HIGH OXIDIZING EFFICIENCY.

984,221.  Specification of Letters Patent.  Patented Feb. 14, 1911.

Application filed May 11, 1907. Serial No. 373,169.

*To all whom it may concern:*

Be it known that I, CHARLES HORNBOSTEL, of New York, county of New York, and State of New York, have invented a new and useful Improvement in the Production of Gases of High Oxidizing Efficiency, of which the following is a specification.

My invention relates to the production of gases of a high degree of oxidizing efficiency, said gases having for the purpose of their application, the transformation into an oxidized state, of sulfurous and other oxidizable gases and materials which contain oxidizable impurities. These may be present in ores, earthy substances, coke, coal gases and other substances which, under certain circumstances, should be subjected to the action of an oxidizing agent.

The object of the invention is the production of gases of high oxidizing energy, the active properties of which gases result from the contact action of atmospheric air at ordinary temperatures with certain chemicals of such relatively low cost that they may be economically restored to full activity after having become somewhat ineffective, so that the process may be worked with a minimum of labor and at a very low cost. The gases resulting from this treatment of air may be applied to purposes of combustion, whereby in the use of purely carbonaceous fuel or a mixture of fuel and ore, a very high degree of heat is obtained, and the combustion may be perfected with the relatively smallest volume of air during a stated period; this combined effect results from the highly oxidizing properties of the air, whereby the impurities such as sulfurous and various organic and inorganic compounds are rendered unobjectionable.

I have found that air, forced at ordinary temperatures, and either at ordinary pressure or under considerable pressure, into a mixture, also at ordinary temperature, of manganese dioxid, sodium or potassium manganate and sulfuric acid, causes by its contact and agitating action on said mixture, a generation of oxygen and ozone, which gases will be taken up by, and become mixed with, the said air, thus giving air led through such a mixture, high oxidizing properties. The said oxygen and ozone are produced by the reactions of the chemicals named, but as heretofore known, only ordinary oxygen is produced by the mutual reactions of the said chemicals and only then when heat is applied. A part of my invention is based on my discovery that oxygen is produced by the mutual reaction of said manganese dioxid, sodium manganate and sulfuric acid in the cold state through the agency of a current of air in causing or promoting such reaction of the ingredients involved, by its agitating action and very intimate contact therewith, part of the oxygen so generated being produced in its allotropic form of ozone. Furthermore, I have found that the oxidizing energy of ozonized air is intensified by the presence, in admixture, of chlorin gas, and that said chlorin gas may be generated by the reaction of sodium chlorid with the three chemicals before named, such generation being assisted by the contact action of the air which has already, by its contact action, assisted in the generation of oxygen and ozone from the mixture of manganese dioxid, sodium or potassium manganate, and sulfuric acid.

I wish at the outset to state that the invention is limited to the specific manner of increasing the oxidizing energy of the air by such additions of oxygen, ozone, and chlorin, induced, by the contact of atmospheric air with the chemicals employed, and does not relate to other conditions, such as will be obtained by the action of applied heat with the resulting chemical changes which occur. In fact the efficiency of the process is seriously impaired, if not destroyed, if heat from an external source is applied, but it is to be distinctly understood that some heat will be generated in the mixture which I employ due to the chemical reaction induced by the agitating action of the air led through the mixture, which generation of heat may cause other reactions which help effect my process.

When air at ordinary temperatures is blown or forced at either ordinary or high pressure into a mixture of manganese dioxid, sodium manganate, and sulfuric acid, the air by its contact and agitating action causes the following reaction, without the application of heat to the materials, to take place:

$$Na_2MnO_4 + MnO_2 + 3H_2SO_4 = Na_2SO_4 + 2MnSO_4 + 3H_2O + O_3,$$

a peculiar feature of the reaction so induced being that the oxygen so produced is, to a large extent, in its allotropic form of ozone. The heat generated by the chemical reac-

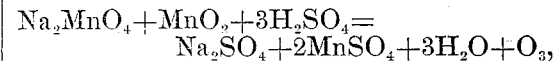

tion, though not of a great degree, is sufficient to promote a further reaction between the manganese dioxid and sulfuric acid, thus producing more oxygen, in this manner:

$$2MnO_2 + 2H_2SO_4 = 2MnSO_4 + 2H_2O + O_2.$$

The water so produced in this and the first reaction above given, will, in the form of steam, react with sodium manganate with the production of more oxygen, as follows:

$$2Na_2MnO_4 + 2H_2O = 4NaHO + Mn_2O_3 + O_2$$

The air, with the additional quantities of oxygen thus given it, together with the ozone so produced, by its agitating action, induces the generation of chlorin gas, by the well-known reaction between sodium chlorid, sulfuric acid, and manganese dioxid, but without the application of heat.

In carrying out my process I lead atmospheric air into contact with a mixture of manganate of soda (or its chemical equivalent manganate of potash), peroxid of manganese, sulfuric acid and chlorid of sodium.

In the accompanying drawing I have shown a preferred form of apparatus by means of which the purposes of my invention may be effected, such apparatus being shown mainly in vertical longitudinal section but partly in side elevation.

It consists of an air blower or fan $x$, the opening through which the air is discharged therefrom being connected by a pipe B, shown partly broken away, with one end of a receptacle A for receiving and holding the chemical mixture employed. The said receptacle A is constructed of materials which are acid-proof and known to be unacted on by any of the chemicals employed or generated. It is shown as rather shallow in proportion to its length so that the air while passing through it is compelled to come into intimate contact with the contained chemical mixture. The receptacle is provided with a partition or wall C by which it is divided into two compartments, the partition C not being too high to interfere with the progress of the air when passing from one compartment into the other. The deflector plates D, D, cause the incoming air to pass downwardly into intimate contact with the chemical mixture spread over the bottom of the receptacle, and E, E, are manholes for charging in the chemicals and removing those portions which are spent. The confined air, after having its oxidizing properties enhanced by sufficient contact with the chemical mixture, passes out by the pipe F, which connects with an end of the receptacle opposite to that at which the pipe B, connects, and by said pipe F is led to a furnace, chimney, disinfecting apparatus or any point where it is desired to get rid of offensive products.

I adjust the proportions of the chemicals employed according to the purposes for which the air with its increased oxidizing properties is used, as different operations require different degrees of oxidizing energy. When using two receptacles, which is the most convenient arrangement of the apparatus by which this part of the process is carried out, I preferably make up a chemical mixture which is placed in both receptacles, this mixture containing, by weight, one part of sodium manganate, ten parts of manganese dioxid in powder form, and eleven parts of sulfuric acid. In preparing this mixture, I first thoroughly mix the sodium manganate and the manganese dioxid, and then gradually add by small portions, the sulfuric acid, meanwhile stirring the mass; the manganese dioxid should not contain lime, as the calcium sulfate which would be formed is objectionable owing to its tendency to harden the mass; I use the ordinary commercial sulfuric acid. This mixture is placed in each of the two intercommunicating receptacles, and in one only of the receptacles, I add chlorid of sodium and sulfuric acid, which reacting with the manganese dioxid employed, would generate chlorin. These are added in such proportion as to obtain the desired percentage of chlorin in the resultant gaseous mixture; for example, I may add from one to four pounds of sodium chlorid and an equal quantity of sulfuric acid. As there is a constant generation of chlorin by mutual reaction of the manganese dioxid, sodium chlorid and sulfuric acid, the chemicals in the receptacle which alone contains the sodium chlorid have to be more frequently renewed than do those in the other receptacle as it will be understood that the manganese dioxid and sulfuric acid will be more rapidly consumed in the vessel which contains the sodium chlorid. I add therefore at certain periods, additional quantities of chlorid of sodium and sulfuric acid. As these are renewed I remove from the receptacle any supernatant acid and by-products of the reaction between the three chemicals mentioned which may have become separated from the mass of chemicals. When recharging the receptacle with sodium chlorid and sulfuric acid it is better to charge each separately into said receptacle, and not mix them until they have entered into contact with the other ingredients. When, according to certain conditions under which my process might be worked, only a limited air pressure can be obtained, I find it best to use a mass of lumps of manganese dioxid of such size that their intervening spaces will allow of the passage of the air. While I prefer to use two receptacles as described, I may use only one receptacle which will contain all the chemicals employed, as the chemical action in either case is the same, that is to say, the mixture of sodium manganate, manganese dioxid and sulfuric acid gives to the air its additional quantities of oxygen and ozone, and the chlorin is generated by the mutual action of the sodium chlorid, manganese dioxid and sulfuric acid in the same manner in the use of one arrangement as in the other.

My preference for the use of two receptacles is based on the greater convenience with which spent matter may be removed, as the contents of the recpetacle in which the chlorid of sodium is employed needs renewing more frequently and the chemicals in the other receptacle need not necessarily suffer disturbance, as the mixture of sodium manganate, manganese dioxid and sulfuric acid remains active for a longer period, as before pointed out.

I claim—

1. The herein described process for the production of gases of high oxidizing efficiency, which consists in leading air into contact with an alkaline manganate, manganese dioxid, sulfuric acid, and sodium chlorid, whereby oxygen, ozone, and chlorin are generated and admixed with said air, and conducting the resulting gaseous mixture to a point where its oxidizing properties are utilized, substantially as described.

2. The herein described process of producing gases of high oxidizing efficiency which consists in leading air into contact with a mixture of sodium manganate, manganese dioxid, and sulfuric acid, whereby oxygen and ozone are generated, and simultaneously causing said air to be brought in contact with a mixture of sodium manganate, manganese dioxid, sulfuric acid and sodium chlorid, whereby chlorin is generated, all of the operations being conducted without the application of heat, and finally leading the gaseous mixture so produced to its point of application, substantially as described.

3. The herein described process which consists in leading air into a receptacle containing sodium manganate, manganese dioxid and sulfuric acid, whereby oxygen and ozone are generated and added to said air, and then leading the gaseous mixture into a second receptacle containing sodium manganate, manganese dioxid, sulfuric acid, and sodium chlorid, whereby chlorin and additional quantities of oxygen and ozone are produced, all of the reactions taking place without the application of heat, and then finally leading the gaseous mixture to a point where its oxidizing properties are utilized, substantially as described.

In testimony whereof I hereunto set my hand this 10 day of May, 1907, in the presence of two attesting witnesses.

CHARLES HORNBOSTEL.

Witnesses:
  MARY B. LETTENBERG,
  LIZZIE L. COLE.